United States Patent [19]

Luine et al.

[11] Patent Number: 4,821,930
[45] Date of Patent: Apr. 18, 1989

[54] BOTTLE MOUNTED ADJUSTABLE LIQUOR DISPENSING DEVICE

[76] Inventors: George J. Luine; John L. Luine, both of 2641 N. Vermont, Los Angeles, Calif. 90027

[21] Appl. No.: 188,486

[22] Filed: Apr. 29, 1988

[51] Int. Cl.[4] .................. G01F 11/26; G01F 11/28
[52] U.S. Cl. .................... 222/454; 222/305; 222/438; 222/442; 222/513; 222/537
[58] Field of Search ............ 222/454, 438, 434, 435, 222/425, 442, 305, 307, 308, 439, 556, 537, 525, 513

[56] References Cited

U.S. PATENT DOCUMENTS

| | | | |
|---|---|---|---|
| 1,279,014 | 9/1918 | Schimel | 222/439 |
| 1,743,293 | 1/1930 | Toft | 222/517 |
| 2,506,125 | 5/1950 | White | 222/442 |
| 2,530,012 | 11/1950 | Gronemeyer et al. | 222/454 |
| 2,645,388 | 7/1953 | Hester | 222/454 |
| 3,894,661 | 7/1975 | Guala | 222/454 |
| 4,226,341 | 10/1980 | Towns et al. | 222/440 |
| 4,582,230 | 4/1986 | Vierkotter | 222/442 |
| 4,684,046 | 8/1987 | Foster et al. | 222/454 |
| 4,690,313 | 9/1987 | Luine et al. | 222/454 |

Primary Examiner—Andres Kashnikow
Assistant Examiner—Christopher Trainor

[57] ABSTRACT

The device consists of a cylindrical body divided into an upper filling chamber and a lower overflow chamber by a moveable component which increases or decreases the size of the filling chamber and determines the amount of liquor to be dispensed. Once the upper chamber is visually determined to be filled a rearward pumping action of the outer body opens the releasing cap and at the same time shuts off the flow of liquor into the filling chamber. The device is attached by insertion into the neck opening of a bottle.

10 Claims, 2 Drawing Sheets

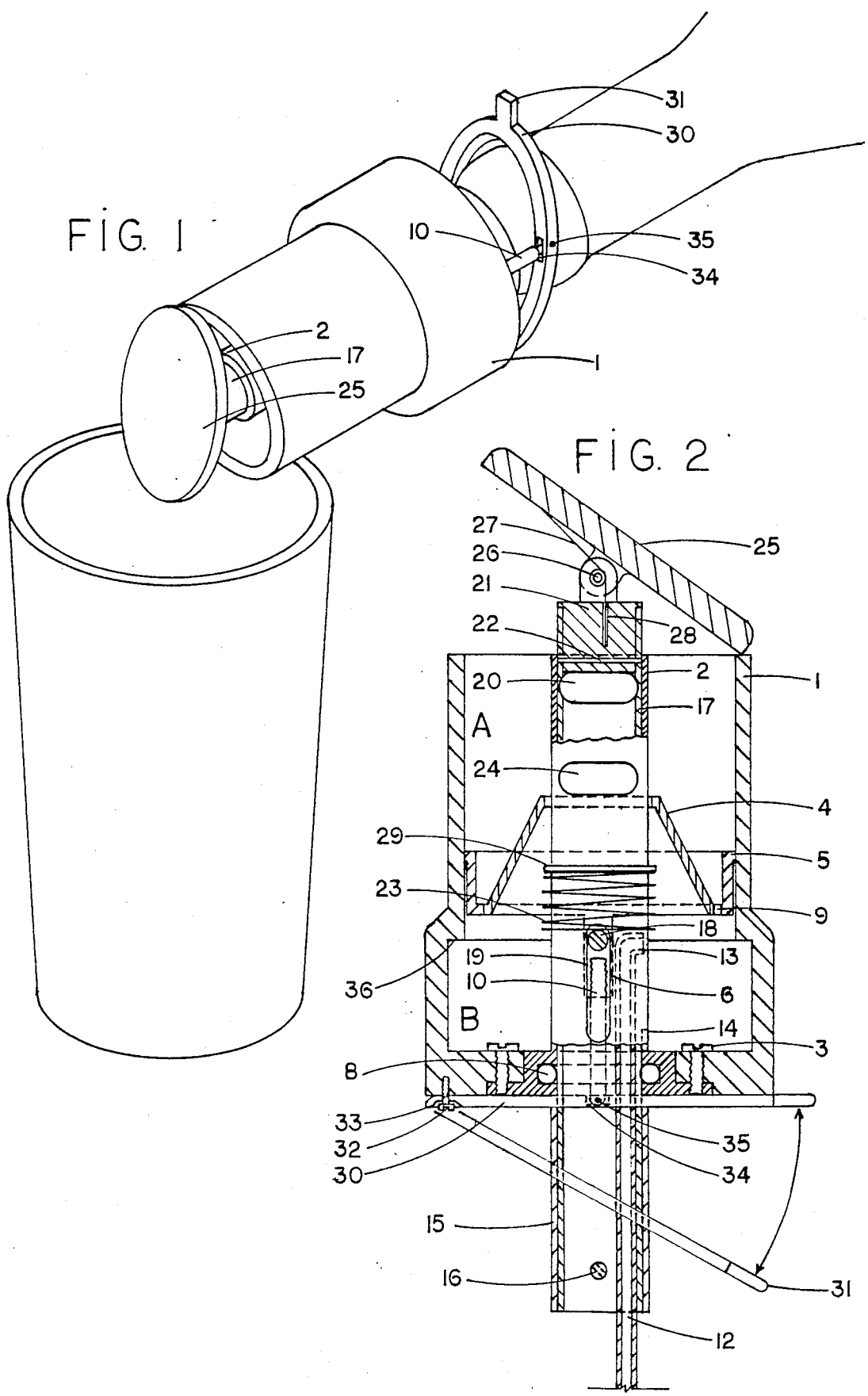

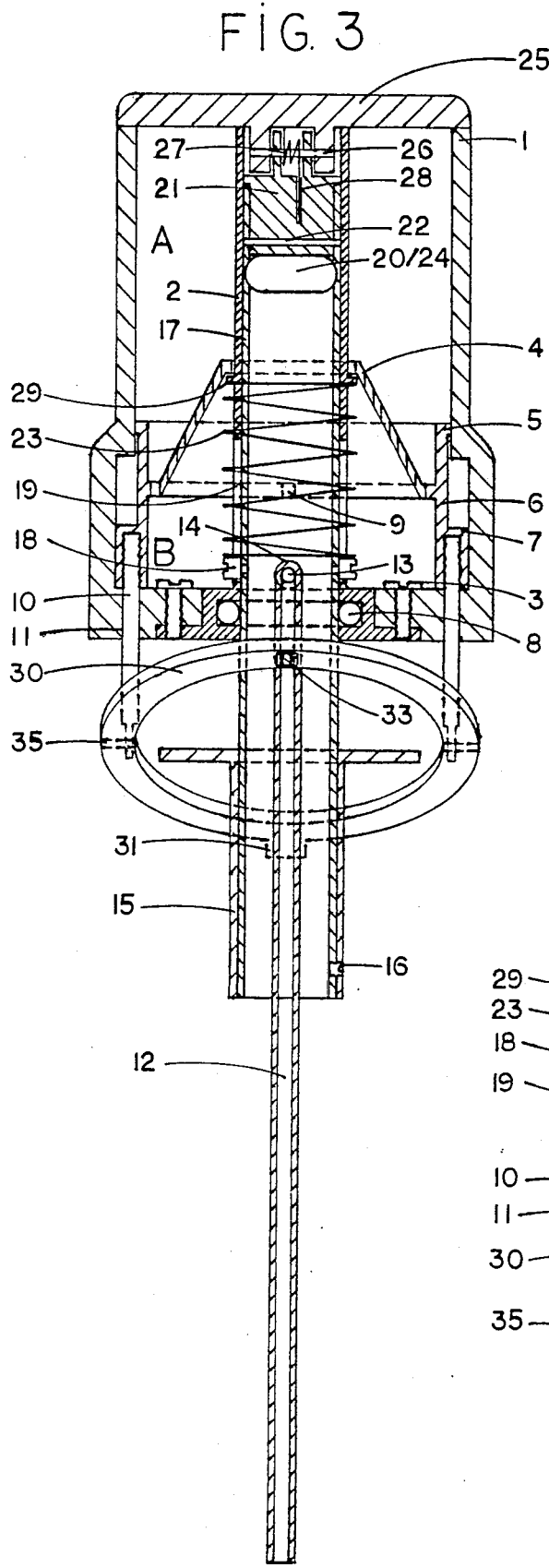
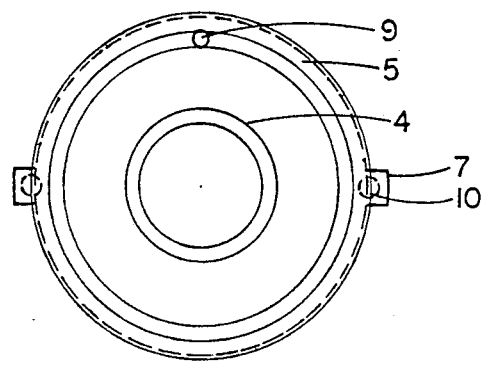
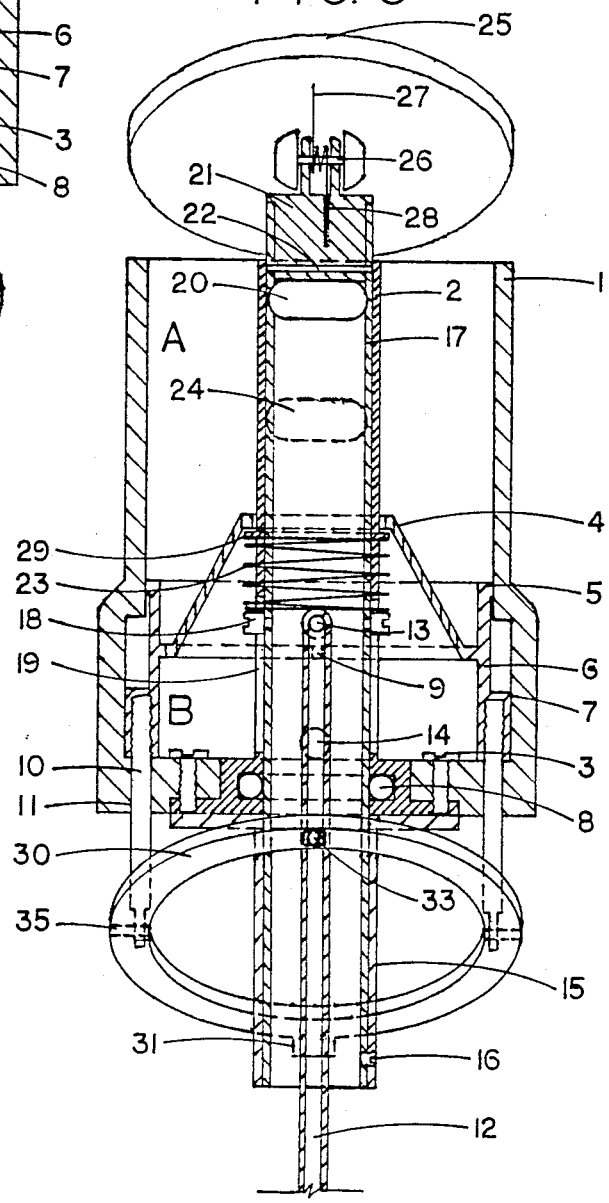

BOTTLE MOUNTED ADJUSTABLE LIQUOR DISPENSING DEVICE

BACKGROUND OF THE INVENTION

1. Field of the Invention

The invention relates to improving the prior art of liquor dispensing by making the measuring process from bottle to measuring container to glass much simpler and faster.

2. Description of the prior art

In order for a person to pour the desired amounts of alcohol from a bottle he or she must have an assortment of different sized shot-glasses and speed-pours. Once a person has these, pouring from a bottle into the shot-glass and then in turn into the glass is accomplished. This measuring process is inefficient and usually sloppy as to do the process quickly, as most people do in order to save time, means that some of the alcohol is spilled. This makes the entire measuring process wasteful in time, alcohol, and is generally inaccurate. Even by free pouring directly into the glass with a speed-pour the waste and inaccuracy is still present. This invention eliminates the waste, stops the inaccuracy, and does the job much faster.

SUMMARY OF THE INVENTION

This invention relates to improving the prior art of liquor dispensing by combining an adjustable liquid chamber with a release assembly and a pouring element as one device. This device is inserted into the top of the bottle wherefrom it is used and stays until the bottle is emptied. With this device a person can adjust quickly and accurately to the desired volume while pouring varying amounts in rapid succession from glass to glass without ever raising the bottle. If the device is filled with alcohol and this amount is not released into a glass a person can simply right the bottle and the liquor will quickly drain back into the bottle. The device employs a fast choke free system. It is the object of this invention to improve the prior art of liquor dispensing by eliminating shot glasses, reducing many motions, saving time and reducing waste.

BRIEF DESCRIPTION OF THE DRAWINGS

FIG. 1: Device as viewed in working position with adjustment ring in lower maximum volume setting with releasing cap member in open position.

FIG. 2: Sectional of device as viewed from its side with moveable outer circular housing pulled back and attached releasing cap member open. Adjustment partition viewed in minimum volume setting with adjustment ring in forward position.

FIG. 3: Sectional of device as viewed from its front with moveable outer circular housing in normal position with attached releasing cap member closed. Adjustment partition viewed in maximum volume setting.

FIG. 4: Top view of adjustment component showing location of air passage opening, adjustment shoulders, and adjustment pins.

FIG. 5: Sectional of device as viewed from its front with moveable outer circular housing pulled back with attached releasing cap member open. Adjustment partition viewed in maximum volume setting.

DETAILED DESCRIPTION OF THE INVENTION

Referring to FIGS. 1 and 3, the device is held in place on top of the bottle by an insertion flange member 15 affixed to the filling member 17 with a set screw 16.

Referring to FIGS. 3 and 5, the amount of liquor to be dispensed is determined by setting the conical adjustment partition 4 with contiguous inner cylindrical adjustment sleeve 5 by moving the adjustment ring 30 by its adjustment ring lever 31. The lever being a beacon to indicate the up position of device in pouring position. The inner cylindrical adjustment sleeve 5 and the adjustment ring 30 are connected by adjustment pins 10 imbedded at upper end thereof into sleeve extension leg shoulders 7 which are contiguous with inner sleeve extension legs 6 affixed to lower edge of inner cylindrical adjustment sleeve 5. The extension legs 6 are opposing at one-hundred-and-eighty degrees each being ninety degrees from air passage opening 9 (FIG.4). The adjustment pins 10 extend downward from extension leg shoulders 7 through formed adjustment openings 11 in base of moveable outer circular housing 1 and are attached at the lower end thereof to adjustment ring 30 in swivel openings 34 (FIG. 2) by swivel pins 35. The adjustment pins 10 are slideably and sealably compatible with adjustment openings 11. The adjustment ring 30 is fastened at its lower periphery to the outer face of base of outer circular housing 1 by a pivot screw 32 (FIG. 2) through elongated pivot opening 33 which allows the lower edge of the adjustment ring 30 to slide on the outer face of base of outer circular housing 1 when ring is manipulated. The extension leg shoulders 7 which protrude beyond the outer diameter of the inner cylindrical adjustment sleeve 4 (FIG. 4) extend into the larger lower diameter of the lower overflow chamber B. In the maximum volume setting the lower edge of the extension leg shoulders 7 rest on the inner face of the base of the outer circular housing 1. In the minimum setting the upper edge of the extension leg shoulders 7 are in contact with the upper edge 36 (FIG. 2) of the undercut in the larger lower diameter of the overflow chamber B. The adjustment pins 10 imbedded in leg shoulders 7 are opposing at one-hundred-and-eighty degrees at a distance apart so as to clear the neck of the bottle when device is in the rearward dispensing position at the maximum volume setting (FIG. 1). The conical adjustment partition 4 is held in place by friction of the outer diameter of the inner cylindrical adjustment sleeve 5 against the inner diameter of the upper filling chamber A as these diameters are slideably and sealably compatible as a push-fit. The smaller inner diameter of conical adjustment partition 4 around the outer diameter of slideable shutoff sleeve 2 is also slideable and sealable.

Referring to FIG. 3, when bottle is inverted liquor therein flows through stationary filling member 17, through formed filling openings 20 in filling member 17, through formed filling openings 24 in slideable shutoff sleeve 2, and into upper filling chamber A where it is contained by releasing cap member 25 which forms a closure seal with outer circular housing 1. Inner diameter of shutoff sleeve 2 and outer diameter of filling member 17 are slideably and sealably compatible and an O-ring 8 in a formed groove at lower end of slideable shutoff sleeve 2 coacting with outside diameter of filling member 17 prevents leakage to the outside at the base of outer circular housing 1. At the same time the air in upper filling chamber A is forced through formed air passage opening 9 in conical adjustment partition 4 (FIG. 4), into lower overflow chamber B, through formed air passage opening 14 in slideable shutoff sleeve 2, through formed air passage opening 13 in air passage member 12, through air passage member 12, into the bottle replacing the amount of liquor which has flown into upper filling chamber A.

Referring to FIGS. 2 and 5, as soon as upper filling chamber A is filled, visually determined, the next step is to slide the moveable outer circular housing 1 manually rearward towards the bottle. The lower flanged end of the slideable shutoff sleeve 2 is attached to the outer face of housing base around a centrally formed opening therein with screws 3. The slideable shutoff sleeve 2 moves simultaneously with moveable outer circular housing 1 thereby mis-aligning the formed filling openings 24 in the slideable shutoff sleeve 2 from the formed filling openings 20 in the filling member 17 therein stopping the flow of liquor into upper filling chamber A. As the moveable outer circular housing 1 moves rearward the flat circular releasing cap member 25, fastened at its center with a hinge pin 26 to the filling cap member 21 imbedded in upper end of filling member 17 by a filling cap retaining pin 22, is opened by an elbow spring 27 located around the hinge pin 26. One end of elbow spring 27 is in elbow spring anchor opening 28 in filling cap member 21 other end thereof resting on inner face of releasing cap member 25.

Referring to FIG. 3, upon releasing the outer circular housing 1 is pushed forward to form a closure seal with releasing cap 25 by a biasing spring 23 located around shutoff sleeve 2. Upper end of biasing spring 23 pressing against spring retaining flange 29 on slideable shutoff sleeve 2 lower end of biasing spring 23 resting on spring retaining screws 18 affixed in filling member 17. Spring retaining screws 18 being perpendicular to axis of filling member 17 and extending through formed elongated spring retaining screw guide openings 19 which parallel axis of slideable shutoff sleeve 2 and extending upward from lower flanged end of shutoff sleeve 2 towards spring retaining flange 29. Screw guide openings 19 allowing for a free movement of slideable shutoff sleeve 2 axially along spring retaining screws 18. Spring retaining screws 18 prevent moveable outer circular housing 1 from rotating around filling member 17. Releasing cap member 25 is prevented from rotating since it is pinned to the filling member 17 which is stationary.

Referring to FIG. 3, if liquor in upper filling chamber A is not dispensed, simply setting the bottle with attached device to the upright position will cause liquor to flow back down the filling member 17 through formed filling openings 20 and 24 and back into the bottle. Any liquor left below the formed filling openings 20 and 24 will drain through formed air passage opening 9 in conical adjustment partition 4, into lower overflow chamber B, through formed air passage opening 14 in slideable shutoff sleeve 2, through formed air passage opening 13 in air passage member 10, through air passage member 10, and back into the bottle thus clearing the device of all liquor. The air passage member 10 serves a dual purpose in which it releases air from upper filling chamber A and also as a drainage means for returning liquor to bottle.

What is claimed is:

1. A bottle mounted liquor dispensing device which comprises: a moveable outer circular housing having a longitudinal axis and a base; a slideable shutoff sleeve with a flange at one end, said shutoff sleeve affixed by its flanged end to an outer face of said base, said axis of said housing coaxial with a longitudinal axis of said sleeve and said base having an opening centrally located; a stationary filling member with an insertion flange member as the lower end thereof; said filling member extending upwardly through said centrally formed opening in said base and through said shutoff sleeve to a releasing cap member at upper end of said outer housing; an outer diameter of said filling member slideably and sealably compatible with an inner diameter of said shutoff sleeve as a slip-fit and further sealably reinforced by an O-ring at lower end of said shutoff sleeve; said filling member having two opposing filling openings one-hundred-and eighty degrees apart at an upper end thereof, said shutoff sleeve forming two opposing filling openings which align with said filling openings in said filling member to form a liquid passage from the bottle through said filling member and said shutoff sleeve when said device is in a rest position; a rearward movement of said housing and said shutoff sleeve mis-aligning said filling openings in said filling member and said shutoff sleeve to close said liquid passage; an air passage member affixed to an inner wall of said filling member and extending downwardly towards said bottle with an opening at the upper end of said air passage member affixed to a formed opening in said filling member at a juncture of said filling member with said base within said housing, said shutoff sleeve having a formed opening at its flanged end, said formed opening in said shutoff sleeve coinciding with said formed opening in said filling member allowing a flow of air from within said outer housing into said air passage member when device is at said rest position; said releasing member attached at its center by a hinge pin member to a filling cap member which closes a terminal end of said filling member, said filling cap member affixed to said filling member by a cap retaining pin through said upper end of said filling member which remains stationary, said releasing member activated by an elbow spring around said hinge pin, one end of said spring being anchored in a form opening in said filling cap member, the other end of said spring acting against the lower half of an inner face of said releasing cap member, said other end of said elbow spring pushing lower periphery of said releasing member outwardly as said outer housing is moved from a closed to an open dispensing position; in the closed position said releasing member being biased towards the upper end of said housing by a biasing spring having upper and lower ends, and positioned around said shutoff sleeve, the upper end of said biasing spring pressing against an upper spring retaining flange around said shutoff sleeve, the lower end of said biasing spring pressing against spring retaining screws anchored in said filling member at the juncture of the inner face of said base of said outer housing and said shutoff sleeve and positioned perpendicular to the longitudinal axis of said filling member placed at equidistant intervals around the perimeter of said filling member, said screws extending outwardly through elongated openings in said shutoff sleeve which are parallel to the longitudinal axis of said sleeve extending upwardly from inner face of said base of said outer housing to said spring retaining flange and allowing therefore free movement of said shutoff sleeve axially along said retaining screws; the length of said elongated openings being determined by the length of movement of said shutoff sleeve to said filling member between said aligned and said misaligned positions of said filling openings, the width of said elongated openings being determined by diameter size of said spring retaining screws so as to allow a smooth passage of said shutoff sleeve along said retaining screws, said screws further preventing rotation of said outer housing around said filling member.

2. A bottle mounter liquor dispensing device, as in claim 1, wherein a manual rearward movement of said moveable outer circular housing overcomes the force of said biasing spring to allow said elbow spring to open attached said releasing cap member.

3. A bottle mounted liquor dispensing device, as in claim 1, wherein a manual rearward movement of said moveable outer circular housing and said shutoff sleeve attached thereto provides a simultaneous release of liquor from within said moveable outer circular housing while stopping the liquid passage from the bottle into said outer housing.

4. A bottle mounted liquor dispensing device, as in claim 1, wherein force of said biasing spring is sufficient to hold said releasing cap member flat against an upper edge of said outer circular housing to form a positive closure seal thus preventing leakage.

5. A bottle mounted adjustable liquor dispensing device which comprises: a moveable outer circular housing having a longitudinal axis and a base; a slideable shutoff sleeve with a flange at one end, said shutoff sleeve affixed by its flanged end to an outer face of said base, said axis of said housing being coaxial with a longitudinal axis of said sleeve and said base having an opening centrally located; a stationary filling member with an insertion flange member at a lower end thereof, said filling member extending upwardly through said centrally located opening in said base and through said shutoff sleeve to a releasing cap member at the upper end of said outer housing; an outer diameter of said filling member slideably and sealably compatible with an inner diameter of said shutoff sleeve as a slip-fit and further sealably reinforced by an O-ring at lower end of said shutoff sleeve; an inner conical partition which divides said outer housing into two chambers consisting of an upper filling chamber and a lower overflow chamber with a larger inner diameter than said upper filling chamber; upper inner diameter of said conical partition slideably and sealably coacting with said shutoff sleeve, lower larger outer diameter of said conical partition contiguous with inner diameter of a cylindrical adjustment sleeve, outer diameter of said inner adjustment sleeve coacting with inner diameter of said upper filling chamber as a push-fit; longitudinal axes of said adjustment sleeve and said outer housing being coaxial, said upper filling chamber being that area within said outer housing above said adjustment partition and external of said shutoff sleeve bounded by an inner face of said releasing cap member, said lower chamber being that area within said outer housing below said adjustment partition and external of said shutoff sleeve bounded by inner face of said base; said adjustment partition having a formed opening near a periphery and adjacent to an inner wall of said adjustment sleeve, said formed opening providing a means of communication between said upper and said lower chambers for air passage and liquid overflow; said adjustment sleeve having two opposing extension legs at one-hundred-and-eighty degrees apart extending downward from its outer diameter each at ninety degrees from said air passage opening, said legs having contiguous shoulders at their lower ends extending laterally into the larger lower diameter of said lower overflow chamber; upper edges of said shoulders when in contact with an upper face of the larger lower diameter of said lower overflow chamber determining a minimum volume setting, lower edges of said shoulders when resting on the inner face of said base of said outer housing determining a maximum volume setting; said shoulders additionally accomodating inserted adjustment pins extending downward and through two formed adjustment openings in said base of said outer housing, said pins and said openings slideably and sealably compatible, said pins at a distance apart so as to clear a neck of a bottle when said device is in a dispensing attitude; said adjustment pins joined to an adjustment ring at said base of said housing with hinge pins to allow for a knee type action, said ring affixed to said base of said housing with a pivot screw through a formed elongated pivot opening at the lower periphery of said ring, said formed opening allowing for a sliding movement on the outer face of said base when said ring is manipulated by an adjustment lever at its upper periphery, movement of said lever in an axial direction varies the volume of said filling chamber as it moves said adjustment partition from the minimum to the maximum volume setting.

6. A bottle mounted adjustable liquor dispensing device, as in claim 5, wherein friction between the inner diameter of said filling chamber and the outer diameter of said inner adjustment sleeve holds said adjustment partition to a pre-selected position.

7. A bottle mounted adjustable liquor dispensing device, as in claim 5, wherein said adjustment pins extending through said formed adjustment openings in said base of said outer housing with said attached ring thereto provides a manipulating means for positioning said adjustment partition.

8. A bottle mounted adjustable liquor dispensing device, as in claim 5, wherein placement of said adjustment partition determines the volume of said upper filling chamber which in turn determines amount of liquor to be dispensed.

9. A bottle mounted adjustable liquor dispensing device, as in claim 5, wherein said conical adjustment partition can be moved axially to the desired volume setting when said device is in a downward dispensing position and said outer housing and said shutoff sleeve are held rearward with said releasing cap member open.

10. A bottle mounted adjustable liquor dispensing device, as in claim 5, wherein said formed air passage opening in said adjustment partition serves as a drainage means for excess liquor not dispensed from said upper filling chamber when said adjustment partition is in any volume setting.

* * * * *